July 6, 1943.  G. P. TORRENCE ET AL  2,323,879
APPARATUS FOR HANDLING THREAD OR THE LIKE
Filed May 26, 1939  7 Sheets-Sheet 1

Fig. 1

Inventors
GEORGE P. TORRENCE
RICHARD F. BERGMANN AND
WALTER F. KNEBUSCH
BY Charles O. Nerrstrom
Attorney July 6, 1943.  G. P. TORRENCE ET AL  2,323,879
APPARATUS FOR HANDLING THREAD OR THE LIKE
Filed May 26, 1939  7 Sheets-Sheet 4

Fig.4

Inventors
GEORGE P. TORRENCE
RICHARD F. BERGMANN AND
WALTER F. KNEBUSCH
BY Charles P. Herrstrom
Attorney

FIG. 5

July 6, 1943.  G. P. TORRENCE ET AL  2,323,879
APPARATUS FOR HANDLING THREAD OR THE LIKE
Filed May 26, 1939  7 Sheets-Sheet 6

Inventors
GEORGE P. TORRENCE
RICHARD F. BERGMANN AND
WALTER F. KNEBUSCH
BY
Charles E. Herrstrom
Attorney

July 6, 1943.   G. P. TORRENCE ET AL   2,323,879
APPARATUS FOR HANDLING THREAD OR THE LIKE
Filed May 26, 1939   7 Sheets-Sheet 7

Inventors
GEORGE P. TORRENCE
RICHARD F. BERGMANN AND
WALTER F. KNEBUSCH
BY Charles E. Herrstrom
Attorney Patented July 6, 1943

2,323,879

UNITED STATES PATENT OFFICE 2,323,879

APPARATUS FOR HANDLING THREAD OR THE LIKE

George P. Torrence, Shaker Heights, Richard F. Bergmann, Lakewood, and Walter F. Knebusch, Rocky River, Ohio, assignors to Industrial Rayon Corporation, Cleveland, Ohio, a corporation of Delaware Application May 26, 1939, Serial No. 275,918

13 Claims. (Cl. 28—71.5)

This invention relates to driving means for apparatus for handling material of the nature of thread or the like, hereinafter referred to simply as "thread." The invention has especial advantages when employed in connection with the manufacture according to the so-called continuous process of thread requiring the application of several processing treatments; e. g., viscose artificial silk thread, on apparatus generally similar to that shown, described and claimed in Knebusch et al. Patent 2,225,642. For the purposes of illustration, the invention will be described hereinafter as applied to the manufacture of viscose artificial silk thread by means of apparatus operating on the principle of that disclosed in said patent.

In apparatus of this type, each thread is continuously but temporarily stored in a large number of generally helical turns, usually on each of a series of several thread store devices arranged in processing sequence. While so stored, the thread is subjected to liquid processing treatment, after which it is dried. As many as 100 or more threads, each requiring several such thread store devices for its production, may be produced on a single machine, this in order that the extremely large simultaneous production of thread necessary to successful commercial operation be attained in as compact a space as possible with equipment cost per thread maintained at a minimum.

In commercial practice, such machines attain a very large size; for example, they may be 50 or more feet long, 10 to 15 feet wide, and in the neighborhood of 20 feet high. This desideratum is rendered difficult of achievement because of the fact that such machines embody hundreds and even thousands of moving parts most, if not all, of which operate in timed relation to each other. In such continuous processing apparatus, it is one of the chief desiderata that the apparatus operate continuously for comparatively long periods; i. e., for weeks at a time, without the necessity of shutting down for repair, parts replacement, or other maintenance purposes.

Due to the very large size of such machines, it has been found advantageous to have the interior thereof left substantially unobstructed, this in order to permit the entrance of operators thereinto for maintenance and repair purposes without the necessity of partially dismantling the machine, as might otherwise be necessary. Consequently, the driving means for all of such large number of moving parts should be of a type which does not obstruct the interior of the apparatus. The driving means of the present invention are so designed as to satisfy this important requirement, together with others of which mention will be made hereinafter.

One of the primary reasons for the employment of such apparatus for the continuous manufacture of thread is to attain a high degree of uniformity of the product. For this reason, parts for each thread; viz., the spinning pump for the extrusion of the spinning liquid into the coagulating bath and the thread store devices to which the thread passes in turn should be operated in timed relation to each other so that constant tensions may be maintained at all times in the thread. Otherwise, tension variations caused by speed variations will give rise, among other things, to variations in the denier of the still plastic thread.

Not only should all of the parts handling the same thread be rotated in timed relation, but all corresponding parts handling all threads on a single machine should be driven in timed relation to each other so that all threads may be produced under uniform conditions. If this were not done, one of the chief benefits of continuous processing apparatus would be lost; to wit, the possibility of producing threads which may be fabricated into a single piece of cloth without revealing where one thread ends and another begins. The present invention makes it possible to satisfy this rigorous requirement; indeed, the invention makes possible apparatus in which all of the parts directly involved in the extruding and processing of the thread are driven from a common source of power so positioned in the machine that a simple, efficient and relatively inexpensive drive mechanism is provided.

Other advantages of the present invention will be apparent from the following description, which relates to a preferred, although only illustrative, embodiment of the invention.

In the apparatus illustrated as embodying the invention, each thread 1 is formed by extrusion of viscose from spinneret 2 into a coagulating bath 3 contained in trough 4. The thread is withdrawn from trough 4 by a suitable thread store device 5 which serves to advance the thread in a plurality of spaced, generally helical turns to a point beyond one edge of the trough. From the thread store device 5 the thread passes downward to the first thread store device of a series of like devices disposed below trough 4, which thread store devices bear reference numerals 6 to 14, inclusive. On each of said devices the thread is stored in a plurality of closely spaced, generally helical turns which are advanced axially of the device by the action of the elements thereof, the thread being meanwhile subjected to suitable processing treatment. After leaving the lowermost device of the series, the thread passes to suitable collecting means, such as the cap twister 15.

The thread store devices mentioned above take the form of thread-advancing reels of cantilever construction, each being supported from one end thereof and having its other end unobstructed. Said reels are adapted, upon rotation, to advance the thread from the supported to the unsupported ends thereof. In the illustrated apparatus, the reels are disposed in stepped arrangement with the unsupported ends of all reels in a single thread-handling series extending in the same direction and with the unsupported end of each reel in the series in apposite relation to the supported end of the next succeeding reel. Numerous advantages are provided by such an arrangement which makes possible, among other things, ready access to the reels for operating purposes.

The reels shown are similar to those shown, described and claimed in Torrence et al. Patent 2,217,716.

Because of the stepped arrangement of reels, the illustrated apparatus may be regarded as made up of two oppositely inclined banks of reels. The portion of the machine including said inclined banks has the appearance of an inverted V when, as in Figures 1 and 2, the machine is viewed from the end thereof. A plurality of thread-producing units is disposed lengthwise of the machine along each side thereof, each of the thread-producing units including a spinneret, a series of reels, and a cap twister. Corresponding parts of adjacent thread-producing units are disposed in corresponding positions lengthwise of the machine as a whole, thus providing numerous benefits, among them economy of construction of the apparatus, ease in driving the various portions of the apparatus, advantages in supplying and removing processing media from the reels, etc.

Figure 2:
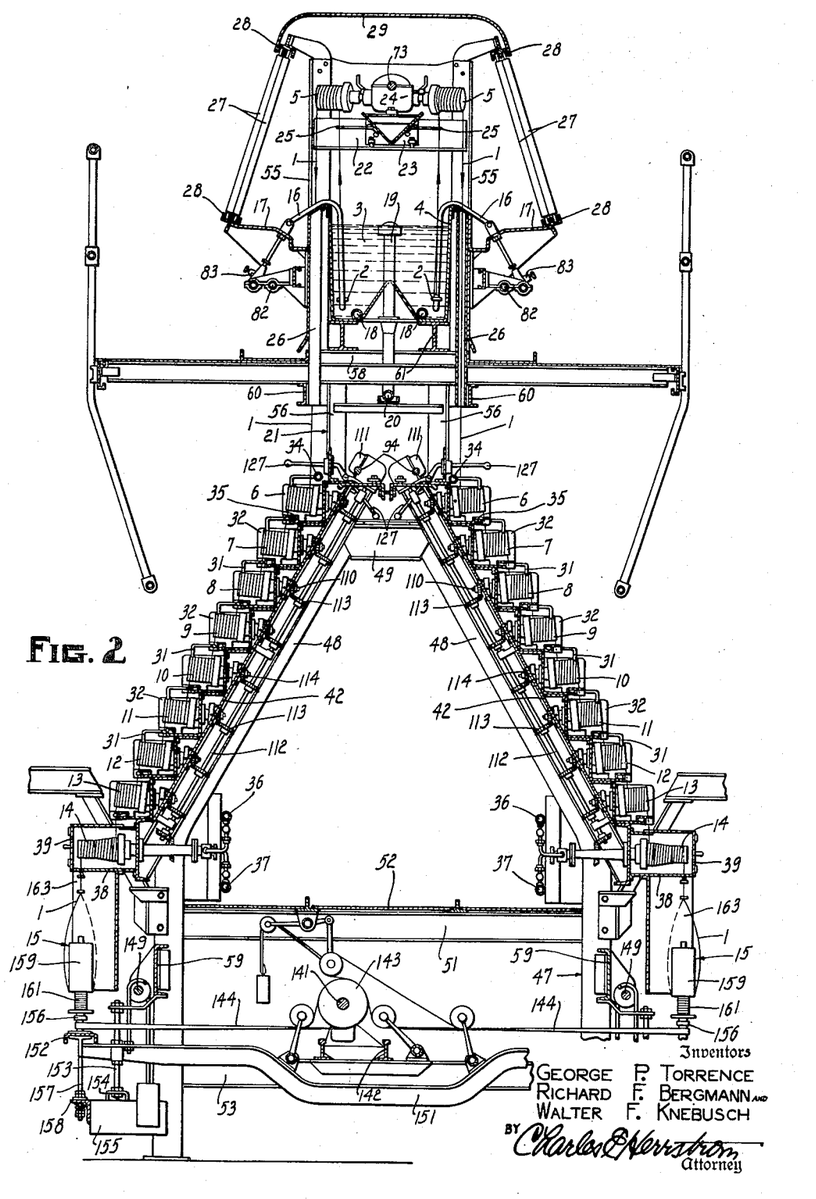
Figure 2 is a sectional elevation on the same scale from line 2—2 of Figure 3.

As shown to advantage in Figure 2, the spinerets 2 are carried by mass tubes 16 pivotally mounted on aprons 17 on the opposite sides of the common coagulating trough 4. Coagulating liquid is supplied to said common coagulating trough 4 from pipes 18 and is removed therefrom through spaced, vertical drain pipes 19 communicating with a drain 20 extending longitudinally of the machine. The upper ends of pipes 19 are disposed at an elevation such as to enable them to maintain the desired level in the coagulating trough. As will be described in greater detail hereinafter, coagulating trough 4 is carried by upright frame members 21, 21a which support the upper portion of the apparatus as a whole.

Each of said upright frame members 21, 21a includes a cross beam 22 supporting the longitudinally extending beams 23 on which are mounted the gear boxes 24 by means of which are supported and driven the upper reels 5. To aid in guiding the thread onto said reels, suitable guides 25, supported by longitudinally extending beams 23, are provided. No processing medium is applied to said upper reels 5 other than the coagulating liquid carried up by the thread itself. Each reel 5 serves as a means for withdrawing a corresponding thread 1 from the spinneret and for conducting such thread beyond the longitudinally extending edge of coagulating trough 4.

The thread from the supported end of each of said upper reels 5 passes downward through a vertically extending channel 26 disposed at the edge of trough 4 to the corresponding series of reels 6 to 14, below. Each of said channels serves as a convenient means for transmitting the thread from the upper reel 5 to the series of reels therebelow, since the thread need merely be dropped through the appropriate channel. In the illustrated apparatus, one of said channels 26 is provided for each thread.

Moreover, the space above the coagulating trough 4 is enclosed by means of a hood to the interior of which access is had through sliding doors 27, which doors are movable longitudinally in upper and lower tracks 28 carried at the edges of aprons 17 and by the upper ends of frame members 21. The vapors from the space above the coagulating trough are exhausted through ventilating duct 29. Enclosure of the space above the coagulating trough prevents dissemination of vapors which might be injurious to other parts of the apparatus because of their corrosive action. Access to the upper portion of the apparatus can be obtained by sliding the overlapping doors 27 lengthwise of the hood as shown, for instance, in Figure 3.

On reels 6 to 12, inclusive, suitable processing liquids are applied to the thread, one such liquid being applied to the thread on each of the first seven of said reels. In the manufacture of viscose artificial silk thread, the liquids applied to the thread on such reels are employed for completing coagulation, washing, desulphurizing, bleaching, oiling, etc. On reel 13, however, no processing liquid is applied to the thread; instead, the liquid applied to the thread on the preceding reel is permitted to drip therefrom preparatory to the step of drying the thread on reel 14.

Figure 3:
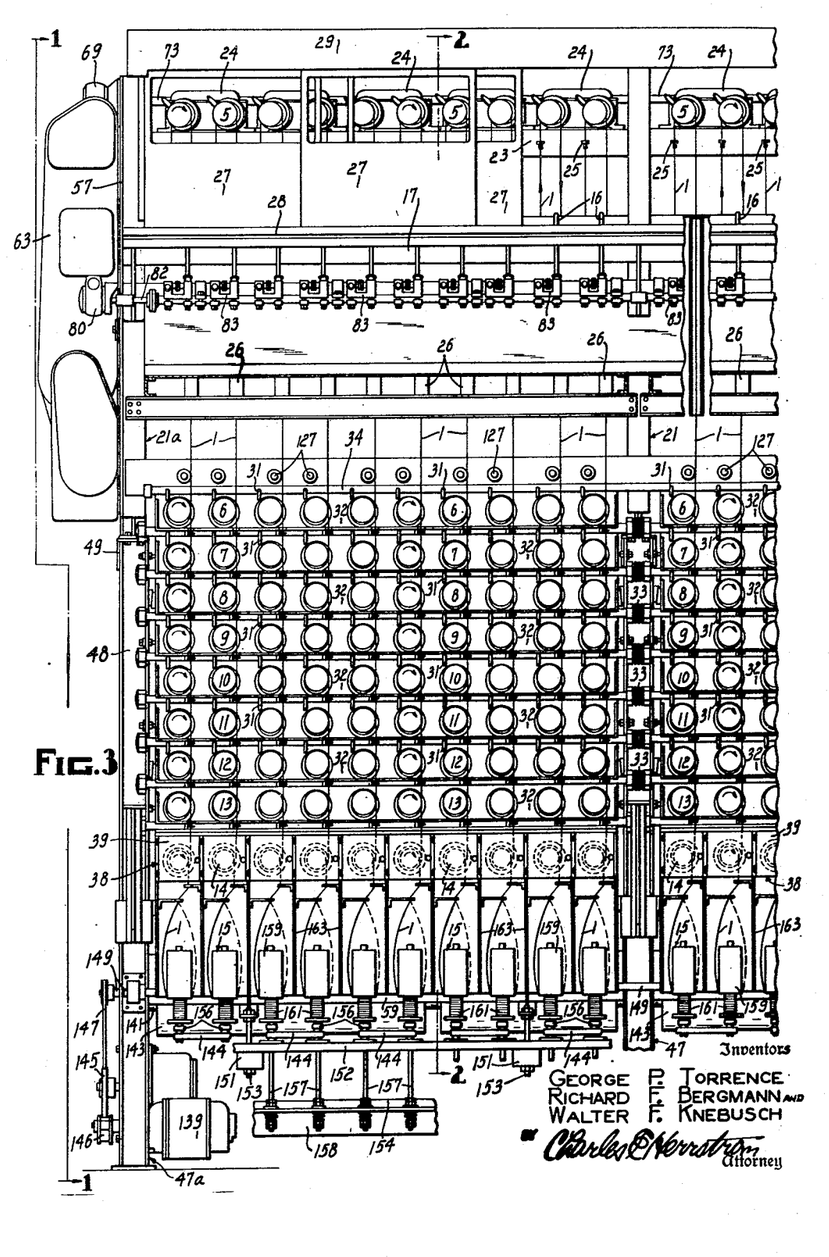
Figure 3 is a side elevation of a portion of said apparatus on the same scale as Figures 1 and 2 from line 3—3 of Figure 1.

On each of the reels on which a processing liquid is applied to the thread, liquid is applied from a reagent distributor 31 disposed above the reel and is collected in a suitable collecting trough 32 disposed below the reel. Because corresponding reels are disposed in corresponding positions lengthwise of the apparatus as a whole, the collecting troughs 32 for the processing liquids may extend below a plurality of corresponding reels in adjacent series, as shown in Figure 3. A similar trough is disposed below drip reel 13. The collecting troughs preferably extend below corresponding reels in ten adjacent series of reels, collecting troughs on the same level being connected together by suitable couplings 33.

Figure 6:
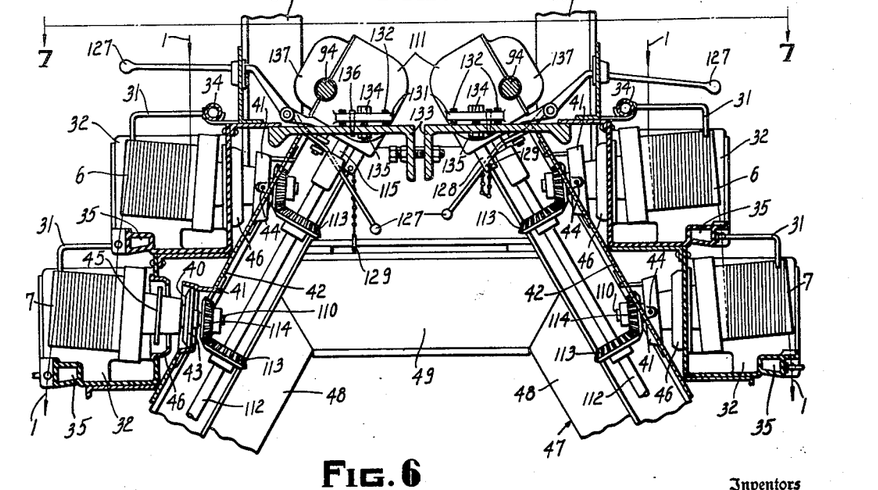
Figure 6 is a sectional elevation on an enlarged scale of the upper portion of the two inclined banks of thread store devices, said elevation corresponding in general to the upper portion of the inclined banks in Figure 2.

Reagent distributors 31 for the first liquid processing reels 6 on each side of the apparatus are supplied from a pipe 34 extending longitudinally of the apparatus. The reagent distributors for the other reels are supplied from conduits 35 formed integrally with the collecting troughs for the preceding reels, as shown in Figures 2 and 6. The reagents may be supplied to the respective pipes or conduits, as the case may be, and drained from the troughs 32 by suitable means disposed at one end of the apparatus. The used reagents may be discharged to the sewer or recirculated, as desired. To facilitate processing, the reels on which liquid is applied to the thread are tilted somewhat from the horizontal, since by this means a countercurrent flow of the processing liquid is obtained.

The reels 14 on each side of the apparatus on which the thread is dried are internally heated by hot water or steam circulated through the interior of each of the reels by the supply and discharge conduits 36, 37, which extend longitudinally of the interior of the machine along each side thereof. Reels 14 are enclosed in suitable housings 38, a hinged door 39 being provided in juxtaposition to each reel 14 to permit access thereto. When open, the door 39 exposes the unsupported end and top of each reel. Housings 38 permit accurate control of the conditions to which the reels 14 are subjected.

Figure 7:
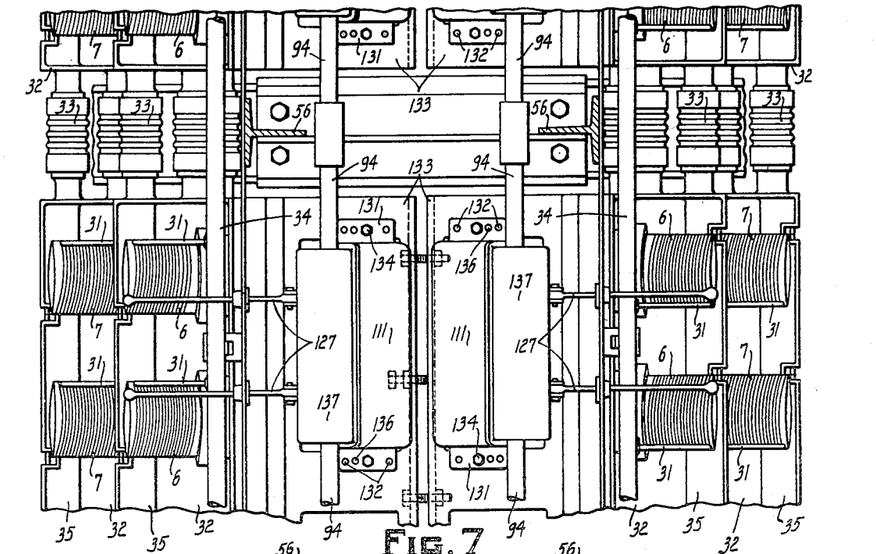
Figure 7 is a plan corresponding to Figure 6.

In the apparatus shown, reels 6 to 13, inclusive, are demountably supported by virtue of the fact that, together with their supporting members 40, they are mounted in cuplike members 41 fixed to the supporting structure of the apparatus. As shown in Figures 2, 6 and 7, the cuplike members 41 are welded to an inclined supporting member 42 having openings therein to receive such members. As shown in Figure 6, supporting member 40 for each of the reels is provided with a flange member 43 rigidly held in its corresponding cup member 41 by set screws 44 threaded into said cup member 41 and bearing against said flange member: by loosening such set screws, the reel as a whole can be removed. A flange 45 mounted on the hub of the reel cooperates with a suitably mounted cuplike member 46 to form a seal preventing liquid from traveling back to the rear of the reel.

Reels 5 are similarly supported by cuplike members associated with gear boxes 24; drying reels 14, by cuplike members fixed to member 42.

As shown in Figures 1 to 6, inclusive, the frame structure of the apparatus includes the inclined supporting members 42, which are themselves carried by and disposed between upright members 47, 47a. Upright members 47, 47a are of generally A-shaped form, being made up of side members 48 inclined toward each other at their upper portions upon which side members are mounted supporting members 42. In each upright member, side members 48 are connected together toward the top thereof by cross beam 49, by intermediate beam 51, which also serves to support the interior floor 52 of the apparatus, and by lower cross beam 53 which serves to support portions of the cap twister mechanism. All of the main upright members are identical, except for drive-end member 47a which is provided with a housing 54 in which are disposed portions of the twister driving apparatus.

Each of such main upright members has mounted thereon an upright member 21 or 21a which is provided with a cross beam 22 to which is connected longitudinal upper beams 23. Such cross beam 22 is supported by vertical members 55 carried by the corresponding main upright member through lower vertical members 56. Drive-end upright member 21a is provided with a plate portion 57 on which parts of the drive mechanism are mounted. Upright members 21 and 21a are also provided with intermediate cross beams 58 from which coagulating trough 4 is supported.

The superstructure so provided serves to support not only the coagulating trough but also its associated mechanism; i. e., the spinnerets, mass tubes, spin pumps, ventilating hood, etc. The composite member made up of each main upright member 47 and its corresponding upright member 21 and the drive-end composite upright member formed of upright members 47a and 21a are rigidly connected to the inclined supporting members 42 which are disposed therebetween. They are also connected together by various longitudinal beams, such as main lower beams 59, superstructure beams 60, trough supporting beams 61, etc.

Figure 4:
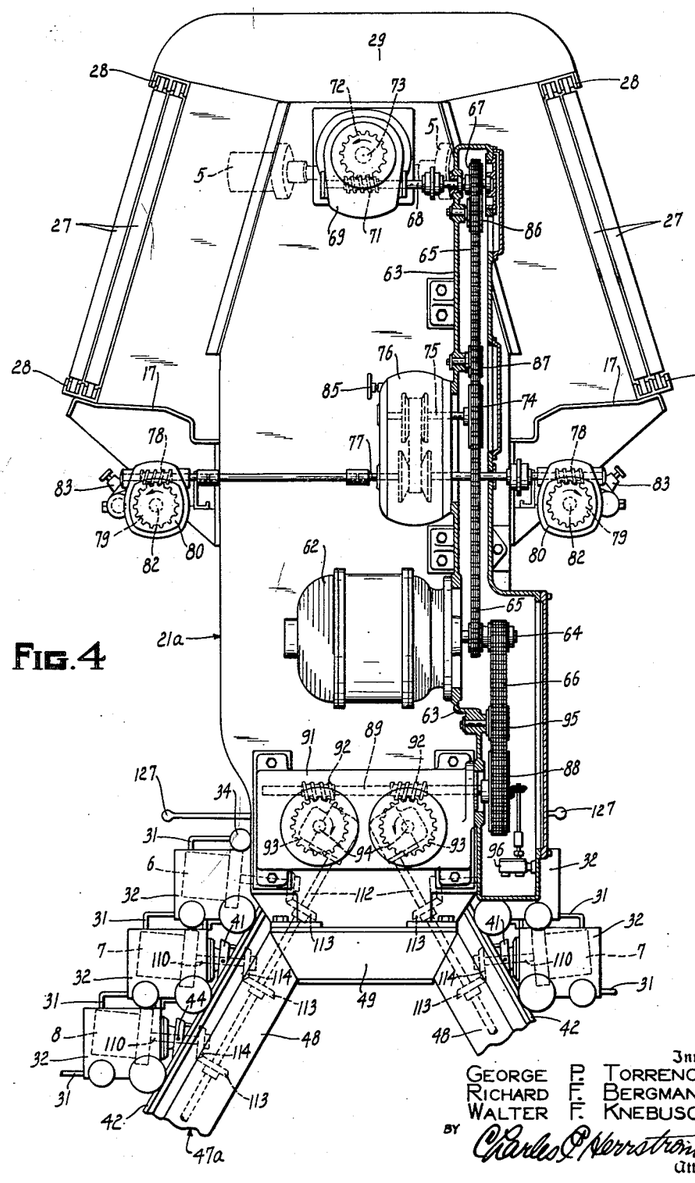
Figure 4 is an elevation on an enlarged scale of the upper portion of the drive end of the apparatus corresponding generally to the upper portion of Figure 1, parts being broken away for the sake of clearness.
Figure 5:
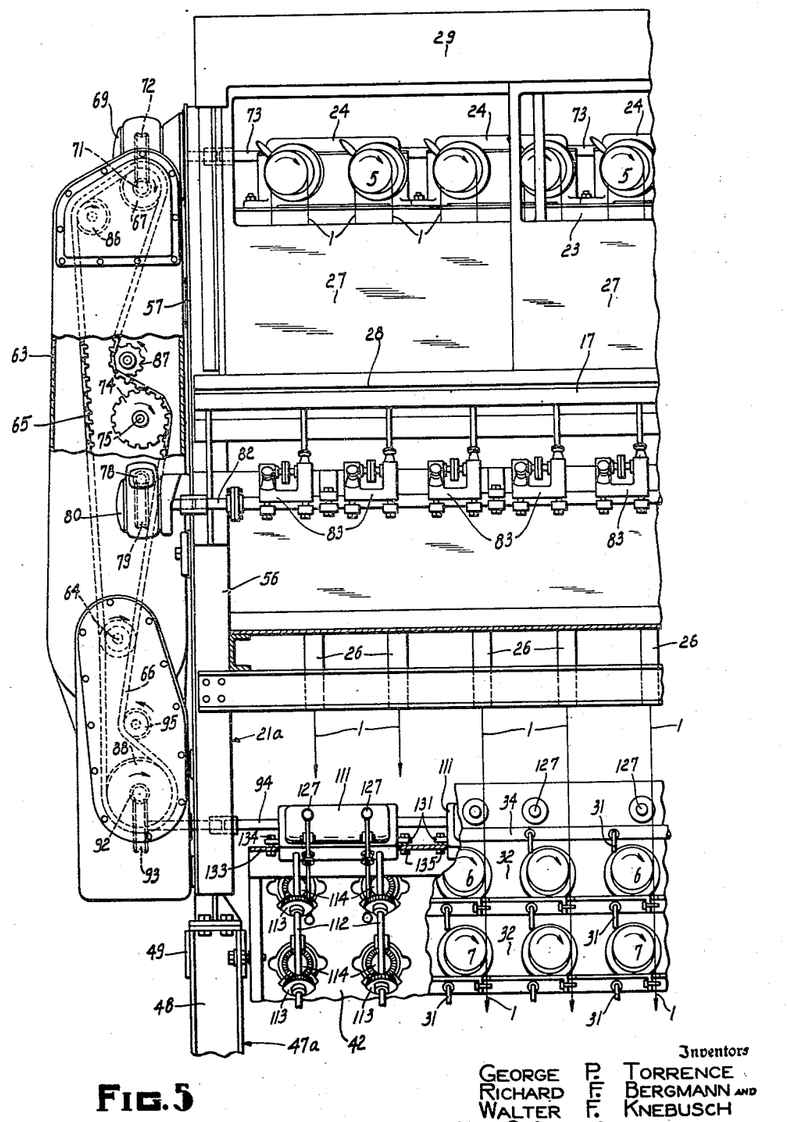
Figure 5 is a side elevation, on the same scale as Figure 4, of the upper portion of the apparatus at the drive end thereof, the same corresponding generally to the upper left-hand portion of Figure 3, parts of Figure 5 being broken away for the sake of clearness.

As will be apparent from the drawings, and particularly from Figures 4 and 5, all of the moving parts of the apparatus other than the cap twister mechanism are driven in timed relation from a single motor 62. Said motor is mounted on the drive-end upright member 21a, since this position has been found to be the most convenient. Motor 62 is mounted on a housing 63 bolted to the drive-end upright member 21a, as shown in Figures 4 and 5.

From sprockets on the driving shaft 64 of said motor are driven two chains 65 and 66, both of said chains being disposed in housing 63. The upper chain 65 passes over the sprocket 67 the shaft of which is coupled to the high speed shaft 68 of a speed reducer 69. The shaft 68 of the speed reducer 69 has mounted thereon a worm 71 engaging the worm wheel 72 in the housing of said speed reducer. As will be hereinafter explained, said worm wheel 72 rotates the shaft 73 from which are driven upper reels 5.

Through sprocket 74 chain 65 actuates the driving shaft 75 of a suitable change speed device, such as the "PIV" unit 76, which is mounted on housing 63. The driven shaft 77 of the unit 76, the speed of which shaft may be varied, extends across the drive-end upright member 21a and, through gears 78 and 79 contained in each speed reducer 80 disposed at each side of the apparatus, serves to rotate drive shafts 82. One of said shafts extends longitudinally of the apparatus along each side thereof, driving spinning pumps 83. Idlers 86 and 87, at least one of wh'ch may be a tensioning idler, are preferably employed to maintain the desired tension in chain 65.

By means of change speed unit 76, the speeds of the spinning pumps 83 with respect to the reels 5 and to the remainder of the reels of the machine can be readily varied. Such variation is effected by simply making a suitable rotary adjustment of knob 85 on unit 76. Adjustment of the speed of the spinning pumps 83 is necessary, for example, if the size of the thread to be formed is changed or if it is desired to vary the amount of stretch on the thread between the spinnerets 2 and the reels 5.

The lower chain 66, through sprocket 88, drives the high speed shaft 89 of speed reducer 91. In said speed reducer, which may be of a standard type, worms 92 on shaft 89 actuate worm wheels 93 each of which rotates a drive shaft 94 extending longitudinally of the apparatus driving all of the reels 6 to 14, inclusive, on one side of the machine, as will hereinafter be explained. A tensioning idler 95 is provided in chain housing 63 to tighten chain 66.

A force feed oil pump 96 may be provided as shown to lubricate the various parts through suitable connections which, in the drawings, are omitted for the sake of clearness.

Reverting now to the means for driving upper reels 5, on each side of the machine a plurality of said reels 5 is disposed lengthwise of and driven from drive 73. As is shown in Figures 2, 3, 5 and 8, four reels 5, i. e., two adjacent reels on each side of the apparatus, are mounted on a single gear box 24. The latter contains the gears by means of which such reels are driven from the longitudinally extending drive shaft 73.

Figures 8, 9, 10, 11, 12:
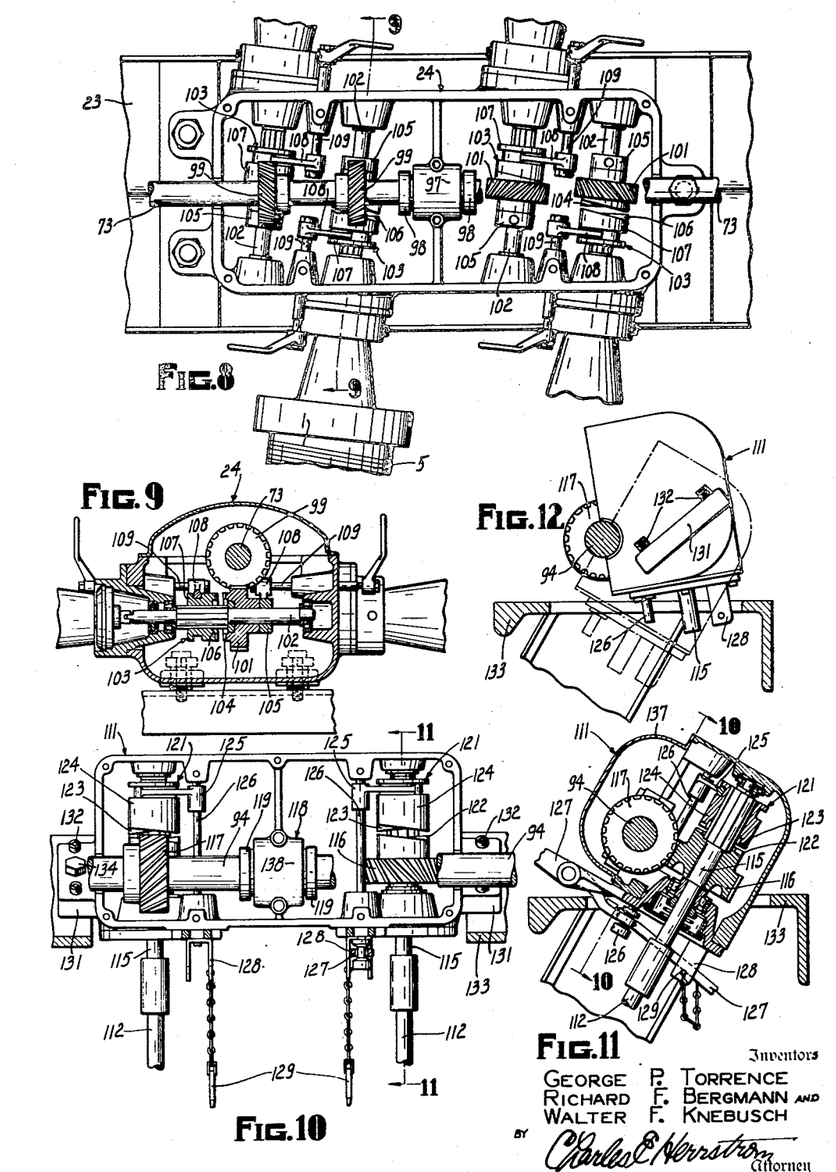
Figure 8 is a plan of one of the upper gear boxes, the cover of the gear box having been removed.
Figure 9 is a sectional elevation of said gear box from line 9—9 of Figure 8.
Figure 10 is an elevation from line 10—10 of Figure 11 of one of the gear boxes for driving the thread store devices.
Figure 11 is a sectional elevation of said gear box from line 11—11 of Figure 10.
Figure 12 is a sectional elevation showing one of said gear boxes as it is swung out of its supporting means.

As is apparent from Figure 8, which shows the interior of a gear box 24, drive shaft 73 passes through said gear box, being journalled in a central bearing 97. Collars 98 mounted on said drive shaft serve to locate said gear box 24 longitudinally with respect to drive shaft 73. A plurality of helical gears 99, one for each reel supported by the gear box 24, are mounted on the drive shaft 73 within gear box 24. Each of said helical gears drives a gear 101 mounted on a shaft 102 journalled transversely of gear box 24 in such manner as to permit it to drive one of the reels 5 from an end thereof projecting through the side wall of gear box 24.

Gear 101 is rotatably mounted on said drive shaft 102 and is connected thereto through suitable clutch means 103. The clutch mechanism preferably comprises teeth 104 formed on gear 101, which is held against longitudinal movement along drive shaft 102 by collar 105. Teeth 104 are adapted to be engaged by teeth 106 on the sliding clutch member 107 mounted on a splined portion of reel drive shaft 102 which clutch member 107 may be shifted into and out of engagement with the teeth on the gear 101 by means of a shifter fork 108 mounted on a slidable rod 109. The later passes through the side of the gear box 24 adjacent the reel driven by the corresponding shaft 101. By means of shifter forks 108, each of the various upper reels 5 can be individually disconnected from its driving means.

As is apparent from Figure 8, the reels 5 are mounted so that their axes of rotation are inclined at an angle to the axis of rotation of shaft 73. This has been found advantageous, since the discharge ends of corresponding opposite reels 5, i. e., the ends at which the threads leave said reels, are in the proper relationship to permit the threads to pass vertically to reels 6 on opposite sides of the machine, which latter reels are directly opposite each other. The driving means for such reels 5 may also be spaced from each other lengthwise of drive shaft 73, making it possible for opposed reels 5 to be rotated in opposite directions from a common drive shaft.

Since it is desirable that the reels on opposite sides of the apparatus be rotated in opposite directions relative to each other, so that all reels rotate in the same direction relative to operators facing the opposite operating faces of the machine, drive shafts 94 are rotated in opposite directions relative to each other from common shaft 89. Each shaft 94 drives all of the various descending series of reels 6 to 14, inclusive, on its side of the apparatus being disposed at the apex of the inverted V defined by the two inclined banks of reels. This position is extremely advantageous since the shafts 94 not only are close to the driving motor 62 but without in any way obstructing the interior of the apparatus are nevertheless readily accessible to the operators working inside the machine.

Each shaft 94 of each side of the apparatus runs through a plurality of spaced individual gear boxes 111. Each gear box contains the gears and clutch mechanism connecting said shaft 94 with one or more inclined drive shafts 112. Each of said inclined drive shafts 112 has disposed along its length a plurality of gears 113, each meshing with a corresponding gear 114 mounted on one of the substantially horizontal drive shafts 110 for one of the reels 6 to 14, inclusive, in a downwardly extending series. Shafts 110 for the reels in each inclined bank are parallel to each other and extend transversely from the bank in a direction generally opposite to that of the shafts 110 of the other bank.

As shown in Figures 6, 7 and 10 to 12, inclusive, each of said gear boxes 111 has journalled therein two stub shafts 115 coupled to corresponding inclined drive shafts 112. Each stub shaft 115 is driven from the drive shaft 94 by a gear 116 mounted on said stub shaft meshing with a gear 117 mounted on drive shaft 94, as shown in Figures 10 and 11. Said shaft 94 is journalled in a central bearing 118 of said gear box 111, being held against endwise movement relative thereto by collars 119 mounted on said shaft on opposite sides of bearing 118. Each gear 116 is rotatably mounted on its stub shaft 115 and is adapted to be engaged in driving relation therewith by suitable clutch means 121.

Said clutch means comprises teeth 122 on said gear 116 adapted to be engaged by teeth 123 on clutch member 124 slidably but non-rotatably mounted on a suitably splined portion of stub shaft 115. Said clutch member 124 is adapted to be shifted by means of a shifter fork 125 mounted on a slidable shifter rod 126 passing out of gear box 111 at the lower portion thereof. Said shifter rod is adapted to be actuated by the lever 127 pivotally mounted on the gear box 111. As is apparent from Figures 6 and 7 each of said levers 127, one of which is provided to disengage each inclined drive shaft 112 from the main drive shaft 94, is provided with one handle portion accessible from the operating face of the bank of reels and another accessible from the interior of the apparatus.

By such means, each downwardly extending series of reels 6 to 14, inclusive, can be disconnected from the driving mechanism and halted either by an operator working at the operating face of the apparatus or by one inside the machine.

Means are also provided for locking the clutch lever 127 in the disconnected position from the interior of the apparatus. As shown in Figures 6, 7, 10 and 11, such means take the form of a clevis 128 into which the interior projecting portion of the lever 127 fits when the clutch is in the disengaged position and in which it is locked by a pin 129. In Figure 6 the right-hand lever is in the locked position. Such locking means make it impossible, by starting the reels rotating from the operating face of the machine, to injure an operator inside the machine engaged in work at the driving mechanism for such reels.

Each of the gear boxes 111 is adjustably mounted in such manner that it may readily be aligned with respect to drive shaft 94. As shown in Figures 6 and 7, each of said gear boxes 111 is provided with a mounting lug 131 at each end thereof. Two set screws 132 are threaded into each lug, such set screws bearing against the supporting member 133 on which the gear box is mounted. The gear box is clamped against supporting member 133 by means of bolts 134 adapted to be tightened by nuts 135 which bolts pass through lugs 131 and supporting member 133.

Consequently, by adjustment of bolts 134, nuts 135 and set screws 132, each of the gear boxes through which each shaft 94 passes can be readily aligned with the shaft and the shaft can be readily aligned with respect to the apparatus. The holes through which the bolts 134 pass may be somewhat larger than the bolts to permit lateral adjustment of the gear boxes. Once the proper adjustment has been made, each gear box may be locked in position by means of a dowel pin 136 driven into holes drilled and reamed in lugs 131 and supporting member 133.

If desired, gear boxes 24 mounted along the shaft 73 may be similarly adjustably mounted with respect to said shaft and with respect to their supporting means.

Any one of the gear boxes 111 may be replaced while the machine is operating without shutting down the machine as a whole. As shown in Figure 12, for instance, it is a simple matter to remove one of the gear boxes by disconnecting the stub shafts 115 from the inclined shafts 112, removing the clutch lever 127, and, after removing the cover 137 from the gear box, removing the bearing cap 138 from the central bearing 118. After the dowel pins 136 and nuts 135 have been removed, the gear box can be swung about the axis of the shaft 94 until it is out of its supporting member 133, as shown in Figure 12, after which the gear box can be removed from the shaft. A gear box 111 may be similarly installed while the shaft 94 is rotating.

While various other kinds of collecting devices may be employed in lieu thereof, the cap twister shown in the drawings has been found to be advantageous in apparatus of this type.

The cap twisting mechanism is preferably driven from an independent source of power, since the driving motor for the cap twisting mechanism can in such case be located in the lower part of the apparatus. Thereby it becomes possible to dispense with the long drive shafts which would otherwise be necessary extending from the upper to the lower portion and obstructing the intermediate portion of the apparatus. The cap twisting mechanism may advantageously be driven in this manner because, being impositive in action, it need not be operated in timed relation to the other parts of the apparatus.

Figure 1:
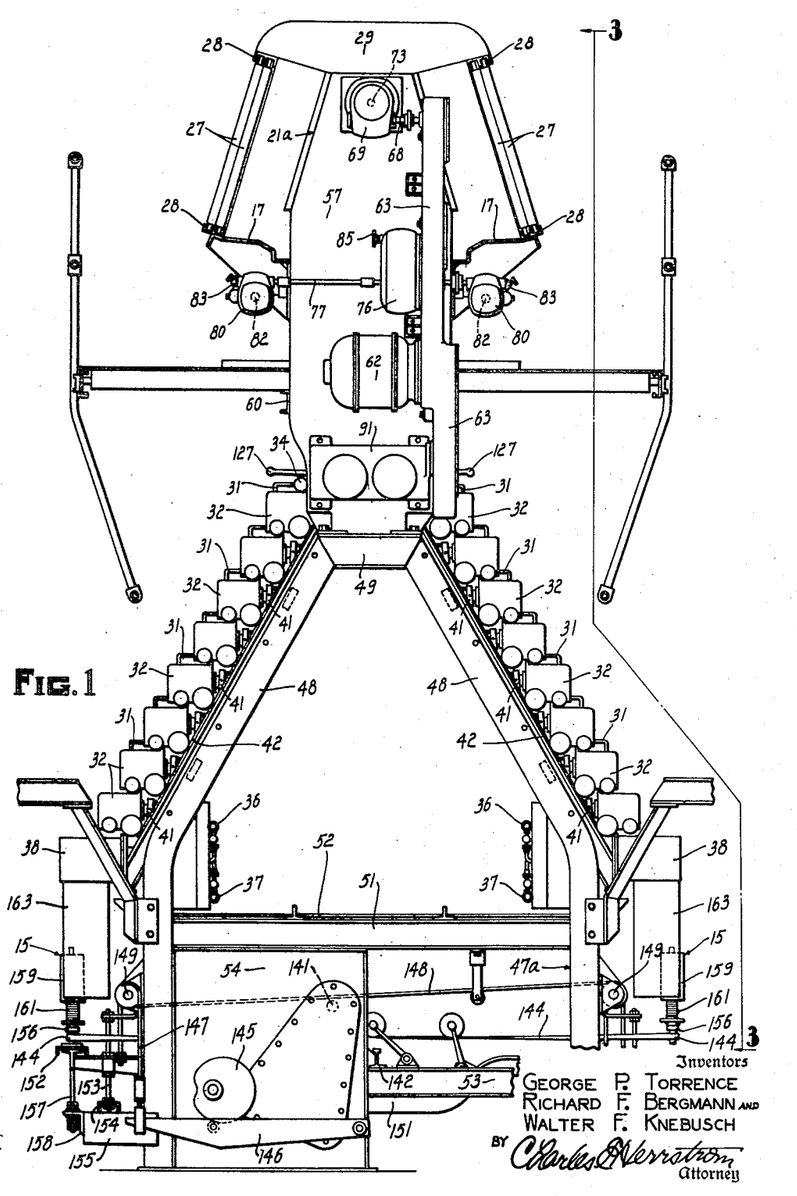
Figure 1 is an elevation of the drive end of the apparatus as a whole, the same corresponding to line 1—1 of Figure 3.

As is apparent from Figures 1 and 3, an independently functioning motor 139 serves to rotate shaft 141 through suitable chain drive mechanism contained in the housing 54 forming part of the drive-end upright member 47a. The shaft 141 extends longitudinally of the apparatus, being supported by the longitudinal beam 142 fixed to the cross beams 53 of main upright members 47 and 47a. Said shaft 141 has mounted thereon a plurality of drums 143 (Figure 2) which drive the belts 144 for the whirls of the cap twister.

Motor 139 also drives the slowly rotating cam 145 through said chain drive mechanism and suitable speed reducing mechanism. Cam 145 actuates the lever 146, which, through a suitable tension member 147 and cross tension member 148, imparts a rotative oscillatory motion to the shafts 149. One of said shafts 149 extends longitudinally of the apparatus along each side thereof, being supported from the main longitudinal beam 59.

Suitable tension members connected to said shafts 149 impart a vertical reciprocatory motion to cross member 151. Several such cross members are provided at intervals lengthwise of the apparatus, two being rigidly connected to each pair of lifting rails 152 on opposite sides of the machine. On each side of the apparatus, cross members 151 are slidably mounted on guide rods 153 connected at their upper ends to a beam 59 forming part of the frame structure and at their lower ends to a beam 154 mounted on brackets 155 fixed to the frame of the apparatus.

As in conventional practice, each twisting unit comprises a rotatable whirl 156 mounted on its corresponding lifting rail 152 and slidably mounted about a vertical spindle 157 which is connected at its lower end to a fixed rail 158 rigidly connected to brackets 155. At its upper end, spindle 157 supports the cap 159 into which collecting bobbin 161 reciprocates and with respect to which it rotates. In operation, the whirls are rotated rapidly by the belt 144 driven by the drum 143 and are slowly vertically reciprocated as a result of the actuation of lever 146 by cam 145. Suitable shields 163 are provided to prevent the balloons on adjacent cap twisters from entangling.

The cap twisting apparatus above described is shown, described and claimed in Bergmann et al. Patent 2,203,665.

From the foregoing description of the preferred embodiment of the invention, it is apparent that the invention provides a simple, efficient and relatively inexpensive driving mechanism which serves to drive the numerous parts which it is necessary to operate in timed relation, without, however, impeding accessibility to the machine for maintenance purposes. It is apparent that the above-described embodiment of the invention is purely illustrative and that numerous modifications may be made therein. It is also evident that the invention may be used in connection with machines of types other than that illustrated without departing in any way from the spirit of the invention. It is intended that the patent shall cover, by suitable expression in the appended claims, whatever features of patentable novelty reside in the invention.

What is claimed is:

1. Apparatus for handling thread comprising a longitudinally extending frame structure; a longitudinally extending main drive shaft; a plurality of gear boxes mounted on the frame structure in which said main drive shaft is journalled; at least one stub shaft journalled in each of the gear boxes; gearing in said gear boxes for actuating the stub shafts from said main drive shaft; an intermediate drive shaft rotatably supported by said frame structure and coupled to each stub shaft; and a plurality of driven shafts journalled in said frame structure and operatively connected to each of said intermediate drive shafts, each of said driven shafts serving to rotate a thread-advancing thread store device.

2. Apparatus of the character described in claim 1 in which the stub shafts are journalled in each of the gear boxes with their axes disposed transversely to the axis of the main drive shaft.

3. Apparatus of the character described in claim 1 in which the frame structure in cross section resembles an inverted V.

4. Apparatus of the character described in claim 1 in which the frame structure comprises two inclined longitudinally extending sides with each of which is associated a longitudinally extending main drive shaft.

5. Apparatus of the character described in claim 1 in which the frame structure in cross-section resembles an inverted V near the apex of which the gear boxes are mounted.

6. Apparatus of the character described in claim 1 in which the longitudinally extending main drive shaft is actuated by driving means disposed at one end of the frame structure.

7. Apparatus of the character described in claim 1 in which clutch means are associated with each of the gear boxes for disengageably connecting the stub shafts to the main drive shaft.

8. Apparatus of the character described in claim 1 in which clutch means are associated with each of the gear boxes for disengageably connecting the stub shafts to the main drive shaft, said clutch means being accessible both from the exterior and from the interior of the frame structure.

9. Apparatus of the character described in claim 1 in which clutch means are associated with each of the gear boxes for disengageably connecting the stub shafts to the main drive shaft, said clutch means being accessible both from the exterior and from the interior of the frame structure and including a device accessible from the interior of said frame structure for locking the clutch means in disengaged position.

10. Apparatus of the character described in claim 1 in which the gear boxes are demountable independently of the main drive shaft and include means for adjustably positioning said gear boxes with respect to the frame structure.

11. Apparatus for handling thread comprising a longitudinally extending frame structure; a longitudinally extending main drive shaft; a plurality of gear boxes mounted along said main drive shaft each of which has associated therewith at least one bearing in which said main drive shaft is journalled, said bearing comprising a removable cap portion connected to a portion associated with said gear box; one or more stub shafts journalled in each of said gear boxes with the axis thereof disposed transversely to that of said main drive shaft; a gear on said main drive shaft meshing with a gear on each of said stub shafts in each gear box, the gear on each of said stub shafts being on the side of said shaft opposite said removable cap; means for supporting said gear boxes on said longitudinally extending frame structure, said supporting means being so formed that when said cap is removed from said bearing each gear box can be removed bodily from said shaft substantially at right angles to the axis thereof; an intermediate drive shaft rotatably supported by said longitudinally extending frame structure coupled to each of said stub shafts; and, driven by each of said intermediate drive shafts, a plurality of driven shafts journalled in said longitudinally extending frame structure, each of said driven shafts serving to rotate a thread-advancing thread store device.

12. Apparatus of the character described in claim 11 including clutch means associated with each of the gear boxes for disengageably connecting the stub shafts to the main drive shaft.

13. Apparatus for handling thread comprising a longitudinally extending frame structure which in cross section resembles an inverted V; a plurality of rotatable thread-advancing thread-store devices mounted in a plurality of downwardly extending series on each of the two longitudinally extending sides of said frame structure; a plurality of downwardly extending drive shafts rotatably mounted within but in parallel relation to each longitudinally extending side of said frame structure, each of said drive shafts being adapted to rotate the thread-advancing thread-store devices of one of said downwardly extending series; a main drive shaft on each longitudinally extending side of said frame structure for rotating the downwardly extending drive shafts on such side, each of said main drive shafts being disposed near the apex of the inverted V defined by said frame structure; a plurality of gear boxes each of which is connected to at least one of said downwardly extending drive shafts mounted along and journalled about each of said main drive shafts, said main drive shafts being supported by said gear boxes; and means adjustably mounting each of said gear boxes on said frame structure.

GEORGE P. TORRENCE.
RICHARD F. BERGMANN.
WALTER F. KNEBUSCH.